S. IDE.

Seed-Dropper.

No. 11,226.

Patented July 4, 1854

UNITED STATES PATENT OFFICE.

SAMUEL IDE, OF EAST SHELBY, NEW YORK.

IMPROVEMENT IN SEED-PLANTERS.

Specification forming part of Letters Patent No. 11,226, dated July 4, 1854.

*To all whom it may concern:*

Be it known that I, SAMUEL IDE, of East Shelby, in the county of Orleans and State of New York, have invented a new and improved distributer for the purpose of conveying the seed from the hoppers to the tubes of seed-drills; and I do hereby declare that the following is a full, clear, and exact description of the same, reference being had to the annexed drawings, making a part of this specification, in which—

Figure 1:
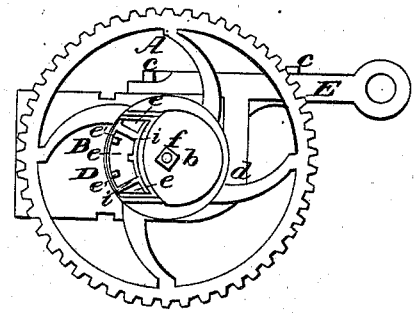
Figure 2:
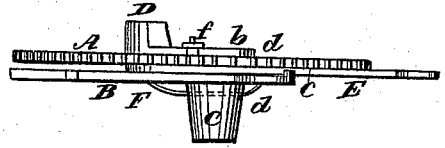
Figure 3:
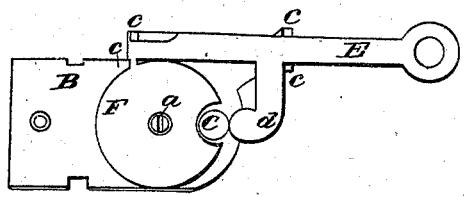
Figure 4:
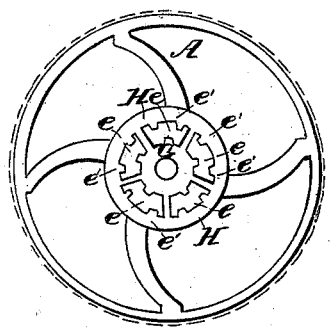

Figure 1 is a top or bird's-eye view of the wheel and hopper. Fig. 2 is a side elevation. Fig. 3 is a top or bird's-eye view with the distributing-wheel removed, showing the base-plate and slide. Fig. 4 is a top or bird's-eye view of the distributing-wheel.

Similar letters of reference indicate corresponding parts in each of the several figures.

To enable others skilled in the art to make and use my invention, I will proceed to describe its construction and operation.

A is a distributing-wheel. B is the plate upon which it revolves, the pivot $a$ on the plate projecting upward and passing through the center of the wheel. The plate B and wheel A are seen more particularly in Figs. 3 and 4.

C is an opening through the plate, under which the tube is placed that conducts the seed to the drill or furrow.

D is a hopper placed on the upper part of the wheel A. This hopper is stationary, and is secured by the pivot $a$ passing up through its circular flange $b$, there being a square on the upper part of the pivot, and a nut, $f$, is screwed down upon the flange. (See Figs. 1 and 2.) It will be seen by referring to these figures that the hopper D is not directly over the opening C, but is placed opposite to it.

E is a movable plate or slide, which works between the dogs or lugs $c\ c\ c\ c$ on the plate B. (Seen more particularly in Fig. 3.) This slide has an arm, $d$, which covers the opening C when the slide is pushed forward, and prevents the seed from passing into the tube. The slots or recesses in the distributing-wheel A are seen in Fig. 4. They are represented by $e$. These slots are so arranged as to cause a continual distribution of the seed, so that the seed may be sufficiently close together for rows or drills. They may be described as being formed of teeth projecting into a circular recess, the space between the teeth forming slots or smaller recesses.

The different parts of the distributer being now described, I will proceed to show the manner in which it operates.

The wheel A being placed on the plate B, the pivot $a$ passing through its center, and the hopper D on the pivot $a$ over the wheel, they are secured by the nut $f$. The hopper is then placed under the seed-box, and the seed, falling into it, passes down into the slots or recesses $e$ in the wheel. The wheel, as it revolves, carries the seed around till it comes over the opening C, when it falls into the tube and is deposited in the furrow. It will be understood that any requisite number of distributers may be on a drill. I have described one. The periphery of the distributing-wheel has teeth or cogs, which mesh into the teeth of the adjoining distributing-wheels. In this way motion is communicated to as many wheels as may be used, the power being applied to the outer one by any suitable gearing from the wheel of the truck or carriage. The wheel A rotates between the hopper-plate $b$ and a circular bearing, F, on the plate B, which forms the top and bottom of the self-feed annular space or chamber, except at the openings D and C, for the reception and discharge of the seed. The hub or center G of the wheel is connected to the outer portion, H, by means of radial arms $i\ i$, which, however, do not obstruct the free passage of the seed in the annular chamber as the wheel revolves, as they do not extend to the bottom F, while the seed in the annular chamber beneath the hopper-plate $b$ will be allowed to pass over the radial arms $i\ i$, there being a cavity in the bottom of the plate $b$ for that purpose, and which also forms the top of the annular chamber. Thus it will be seen that the seed is rendered self-feeding in the annular space without being crowded or injured, and is uniformly discharged therefrom through the opening C.

Having thus described the nature of my invention and the operation of the same, I will state that I am aware that distributing disks or wheels provided with apertures or holes for receiving the seed from the hopper and carrying it around to the drill-tube and discharging the same therein have been used, by which ar- rangement the seed is delivered in jets and deposited in hills of greater or less distance apart; but I am not aware that an annular space or opening has been formed around the center of a horizontal rotating cog-wheel furnished with ribs or projections $e'$, so disposed on the adjacent surfaces of the annular space or opening that the ribs or projections next to the center of the wheel shall be situated relatively so as to be opposite the space between the ribs or projections on the adjacent side of the space or opening, but without meeting, and thus by their peculiar arrangement form a series of connected chambers or recesses of similar capacity wherein the seed is received from the hopper, and whereby the distribution thereof is rendered uniform and continuous during the rotation of the horizontal wheel, the seed being rendered self-feeding while resting upon the surface F, Fig. 3, as the wheel rotates without the slightest injury thereto simply by the peculiar disposition of the projections in the annular opening. Therefore

What I claim as my improvement, and desire to secure by Letters Patent, is—

The series of connected chambers or recesses around the center of the rotating cog-wheel A, constructed substantially as described, whereby a uniform and continuous distribution of the seed is effected.

In testimony whereof I have hereunto signed my name before two subscribing witnesses.

SAMUEL IDE.

Witnesses:
A. E. H. JOHNSON,
I. F. PRUCKNER.